United States Patent
Arceo et al.

(10) Patent No.: US 11,248,717 B2
(45) Date of Patent: Feb. 15, 2022

(54) MODULAR SMART SOLENOID VALVE

(71) Applicant: Automatic Switch Company, Florham Park, NJ (US)

(72) Inventors: Emmanuel D. Arceo, Bloomfield, NJ (US); John J. Haller, Boonton, NJ (US)

(73) Assignee: AUTOMATIC SWITCH COMPANY, Florham Park, NJ (US)

( * ) Notice: Subject to any disclaimer, the term of this patent is extended or adjusted under 35 U.S.C. 154(b) by 0 days.

(21) Appl. No.: 16/457,760

(22) Filed: Jun. 28, 2019

(65) Prior Publication Data
US 2020/0408323 A1    Dec. 31, 2020

(51) Int. Cl.
*F16K 31/06*   (2006.01)
*F16K 27/02*   (2006.01)

(52) U.S. Cl.
CPC ........ *F16K 31/0675* (2013.01); *F16K 27/029* (2013.01)

(58) Field of Classification Search
CPC .. F16K 31/046; F16K 31/0655; F16K 27/029; G05D 7/0676
USPC ........................................ 251/129.04, 129.15
See application file for complete search history.

(56) References Cited

U.S. PATENT DOCUMENTS

| | | | |
|---|---|---|---|
| 5,925,826 A | 7/1999 | Kodama et al. | |
| 6,116,269 A | 9/2000 | Maxson | |
| 6,237,617 B1 | 5/2001 | Sturman et al. | |
| 6,263,915 B1 | 7/2001 | Hayashi et al. | |
| 6,386,229 B1 | 5/2002 | Morikawa et al. | |
| 6,390,129 B2 | 5/2002 | Jansen et al. | |
| 6,422,256 B1 * | 7/2002 | Balazy ................. | G05D 7/0635 137/12 |
| 6,520,202 B2 | 2/2003 | Miyazoe et al. | |
| 6,591,865 B2 | 7/2003 | Misumi | |
| 6,612,332 B2 | 9/2003 | Miyazoe et al. | |
| 6,840,273 B2 | 1/2005 | Miyazoe et al. | |

(Continued)

FOREIGN PATENT DOCUMENTS

| | | |
|---|---|---|
| CN | 201739610 U | 2/2011 |
| DE | 10 2008 050252 A1 | 4/2010 |

(Continued)

OTHER PUBLICATIONS

International Search Report and Written Opinion of the International Searching Authority dated Oct. 6, 2020 for International Application No. PCT/US2020/040024.

*Primary Examiner* — Seth W. Mackay-Smith
(74) *Attorney, Agent, or Firm* — Mackey Law Firm PLLC (57) ABSTRACT

A module for a solenoid valve can include a body having a module inlet, a module outlet, a flow path fluidically between the inlet and the outlet, a module orifice and a module valve seat fluidically disposed in the flow path, a reservoir disposed within the body, a sensor in sensing communication with the reservoir, a first coupler configured to couple with a solenoid actuator and a second coupler configured to couple with a valve body. The flow path can include an inlet flow path from the module inlet to the module orifice and an outlet flow path from the module orifice to the module outlet. The reservoir can be in fluid communication with at least one of the inlet flow path and the outlet flow path. The module outlet can be disposed in fluid communication with the second coupler and configured to sealingly engage a valve seat.

20 Claims, 4 Drawing Sheets

(56) References Cited

U.S. PATENT DOCUMENTS

| | | | |
|---|---|---|---|
| 6,923,207 B2 | 8/2005 | Misumi | |
| 6,953,057 B2 | 10/2005 | Wade | |
| 7,066,196 B2 | 6/2006 | Hatanaka | |
| 7,188,592 B2 | 3/2007 | Baldi et al. | |
| 7,405,917 B2 | 7/2008 | Ahrens et al. | |
| 7,624,632 B1 * | 12/2009 | Hoyle | G01M 3/2807 73/204.11 |
| 7,758,015 B2 | 7/2010 | Morikawa | |
| 7,805,208 B2 | 9/2010 | Koenig | |
| 7,828,008 B1 | 11/2010 | Beckman et al. | |
| 7,866,625 B2 * | 1/2011 | Lee | F15B 13/043 251/30.04 |
| 7,930,089 B2 | 4/2011 | Askew | |
| 7,950,413 B2 | 5/2011 | Fleischer et al. | |
| 8,061,385 B2 | 11/2011 | Kaitsuka | |
| 8,072,343 B2 | 12/2011 | Flanders | |
| 8,118,276 B2 | 2/2012 | Sanders et al. | |
| 8,192,172 B2 | 6/2012 | Baker et al. | |
| 8,246,121 B2 | 8/2012 | Homann et al. | |
| 8,251,194 B2 | 8/2012 | Fujii et al. | |
| 8,264,810 B2 | 9/2012 | Wellner et al. | |
| 8,276,877 B2 | 10/2012 | Cha et al. | |
| 8,387,644 B2 | 3/2013 | Najmolhoda et al. | |
| 8,424,563 B2 | 4/2013 | Haller et al. | |
| 8,511,337 B2 * | 8/2013 | Nishimura | F16K 31/0655 137/487.5 |
| 8,579,252 B2 | 11/2013 | Heer | |
| 8,602,054 B2 | 12/2013 | Jilderos | |
| 8,622,077 B2 | 1/2014 | Pogel et al. | |
| 8,672,291 B2 | 3/2014 | Tyler | |
| 8,678,346 B2 * | 3/2014 | Haller | F16K 31/0675 251/129.04 |
| 8,813,776 B2 | 8/2014 | Stark et al. | |
| 8,814,133 B2 | 8/2014 | Li et al. | |
| 8,905,067 B2 | 12/2014 | Maichl et al. | |
| 8,905,371 B2 | 12/2014 | Penning et al. | |
| 8,924,028 B2 | 12/2014 | Neilson et al. | |
| 8,960,639 B2 * | 2/2015 | Hilzendegen | F16K 31/44 251/129.15 |
| 9,134,107 B2 | 9/2015 | Kahl et al. | |
| 9,206,920 B2 | 12/2015 | Zula | |
| 9,238,242 B2 | 1/2016 | Zumberger et al. | |
| 9,404,434 B2 | 8/2016 | Leteinturier et al. | |
| 9,404,599 B2 | 8/2016 | Peterson et al. | |
| 9,423,050 B2 | 8/2016 | Anderson | |
| 9,435,459 B2 | 9/2016 | Bedingfield | |
| 9,458,612 B2 | 10/2016 | Thomas et al. | |
| 9,568,089 B2 | 2/2017 | Phillips et al. | |
| 9,624,883 B2 | 4/2017 | Namudur et al. | |
| 9,624,947 B2 | 4/2017 | Burgett et al. | |
| 9,658,628 B2 | 5/2017 | Burt | |
| 9,677,549 B2 | 6/2017 | Bauck et al. | |
| 9,677,550 B2 | 6/2017 | Bauck et al. | |
| 9,684,310 B2 | 6/2017 | Haller | |
| 10,670,163 B1 * | 6/2020 | Yu | F16K 31/42 |
| 2013/0294623 A1 * | 11/2013 | Askew | H04R 1/42 381/165 |
| 2014/0096839 A1 * | 4/2014 | Roedel | F16K 27/029 137/15.18 |
| 2015/0047720 A1 | 2/2015 | Tamba | |
| 2015/0107675 A1 | 4/2015 | Kucera | |
| 2015/0176718 A1 | 6/2015 | Zhuo | |
| 2016/0070272 A1 | 3/2016 | Sugimoto et al. | |
| 2016/0077530 A1 | 3/2016 | Moran et al. | |
| 2016/0102779 A1 | 4/2016 | Lang et al. | |
| 2016/0131276 A1 | 5/2016 | Okawara | |
| 2016/0291075 A1 | 10/2016 | Sommansson | |
| 2017/0074417 A1 * | 3/2017 | Okawara | F16K 31/0686 |
| 2017/0075365 A1 | 3/2017 | Tarantino et al. | |
| 2017/0097646 A1 | 4/2017 | Igarashi | |
| 2017/0122268 A1 | 5/2017 | Hashimoto | |

FOREIGN PATENT DOCUMENTS

| | | | |
|---|---|---|---|
| DE | 102014006511 A1 * | 11/2015 | F15B 13/0882 |
| EP | 1319565 B1 | 11/2002 | |
| EP | 1319566 A2 | 11/2002 | |
| EP | 971278 B1 | 8/2003 | |
| EP | 1797361 B1 | 10/2005 | |
| EP | 2443373 B1 | 5/2010 | |
| EP | 2518575 B1 | 1/2016 | |
| EP | 3021021 A1 | 5/2016 | |
| KR | 101 900 919 B1 | 9/2018 | |
| WO | WO 98/36165 A1 | 8/1998 | |
| WO | 2016189196 A1 | 12/2016 | |
| WO | 2017075683 A1 | 5/2017 | |
| WO | WO 2018/021280 A1 | 2/2018 | |

* cited by examiner

MODULAR SMART SOLENOID VALVE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to valves and more specifically relates to solenoid valves and control systems for solenoid valves.

Description of the Related Art

Flow control systems are common in process and manufacturing systems, such as in sterile, aseptic, physiological and food applications, among others, including applications in hazardous or harsh environments. It can be important to accurately monitor and control various parameters in such systems, including flow rates, valve positions, pressure, valve health and other aspects of fluid control components. Accordingly, fluid control systems and valves that provide rapid and accurate control of fluids are called for in numerous industries. Further, some industries and applications call for fluid control systems and valves that incorporate features relating to safety, system monitoring and protection against failures. In addition, in the current state of technology, there is often a demand for fluid control components, including valves, that fit into relatively small spaces versus their larger predecessors without comprising performance or functionality.

A solenoid valve is a type of control valve that typically utilizes a powered solenoid coil and related components to control fluid flow through the valve. Many solenoid valves have default positions, such as normally open or normally closed, to which the valve defaults until actuated. In the event of a loss of power, a solenoid valve may have a default or failure mode, such as fully open or fully closed. In a conventional solenoid valve, electrical power can be supplied to the solenoid coil to provide power to operate a valve mechanism isolated from the coil. In some solenoid valves, the only actuation coupling that exists between the coil and the valve mechanism may be the action of the magnetic field that the coil exerts on magnetically susceptible parts in a vessel containing the pressurized fluid controlled by the valve. Creating a solenoid valve that would be able to communicate information about the nature of the operation fluid within the pressure containing vessel can be difficult because extracting the information can require embedding sensors into the pressure containing vessel of the valve and running electrical connections from the sensors to the solenoid coil, where the normal electrical connections are made. The sensors may need to receive power and to send or receive one or more signals regarding sensed information as well. These electrical connections can form a problematic umbilical cord between the two sections of a solenoid valve that increase the chances for improper operation or failure of the valve.

Accordingly, there is a need in the art for improved solenoid valves having increased monitoring and control features without jeopardizing durability or reliability. Additionally, there is a need in the art for improved solenoid valve control systems for cooperating with other fluid system components and providing advantageous control and fail-safe features. There is also a need in the art for transforming or converting conventional solenoid valves into smart solenoid valves having advantageous control and monitoring features. The disclosures and teachings of the present disclosure are directed to systems and methods for improved solenoid valve structures and control systems.

BRIEF SUMMARY OF THE INVENTION

In at least one embodiment, a module for a solenoid valve can include a body having a module inlet for allowing fluid flow into the body, a module outlet for allowing fluid flow out of the body and a module flow path fluidically between the module inlet and the module outlet, a module orifice and a module valve seat fluidically disposed in the module flow path, a first reservoir disposed within the body, a first sensor disposed in sensing communication with the first reservoir, a first coupler configured to couple with a solenoid actuator, and a second coupler configured to couple with a valve body. A module flow path can include an inlet flow path from the module inlet to the module orifice and an outlet flow path from the module orifice to the module outlet. A first reservoir can be in fluid communication with at least one of the inlet flow path and the outlet flow path.

An auxiliary flow path can have a first end in fluid communication with the first reservoir and a second end in fluid communication with at least one of the inlet flow path and the outlet flow path. A module orifice and a module valve seat can be disposed in fluid communication with the first coupler and the module valve seat can be configured to sealingly couple with a valve member of a solenoid actuator. A module outlet can be disposed in fluid communication with a second coupler and can be configured to sealingly engage a valve seat of a valve body. One or more modules can be configured to be coupled to, which can include being disposed at least partially fluidically between, a valve actuator and a valve body configured to couple with one another. One or more sensors can be disposed at least partially (or fully) within one or more reservoir or other portions of a module.

In at least one embodiment, a module can include a second reservoir disposed within the body and a second sensor disposed in sensing communication with the second reservoir. A first reservoir can be in fluid communication with one of the inlet flow path and the outlet flow path and a second reservoir can be in fluid communication with the other of the inlet flow path and the outlet flow path. A first sensor can be disposed at least partially within a first reservoir and a second sensor can be disposed at least partially within a second reservoir. A module can include a cover removably coupled to the module body. A cover can be configured to enclose at least a portion of one or more reservoirs. A cover can include one or more openings configured to couple with at least a portion of one or more couplers or other valve or module components.

In at least one embodiment, a module can include a plurality of reservoirs, such as first, second, third and/or other reservoirs, and can include one or more walls or other borders or structures disposed at least partially between one or more reservoirs, which can include forming at least a portion of a reservoir wall or other boundary. In at least one embodiment, a module can include one or more receiving coils configured to wirelessly or otherwise receive power from one or more transmitting coil. One or more sensors and one or more receiving coils can be disposed at least partially within a module body. In at least one embodiment, a solenoid valve can include a body, an actuator and a module according to the disclosure.

A solenoid valve can include a valve body having a valve inlet and a valve outlet, a solenoid having a solenoid coil, a movable plunger in magnetic communication with the coil and a valve member coupled to the plunger, a module coupled to the valve body and the solenoid, the module comprising a module inlet disposed in fluid communication with the valve inlet, a module outlet disposed in fluid communication with the valve outlet, a module orifice and a module valve seat disposed along a module flow path fluidically between the module inlet and the module outlet, and one or more sensors coupled to the module and disposed in sensing communication with the module flow path.

A valve member of the solenoid can be adapted to sealingly engage the module valve seat. A module inlet can be adapted to sealingly engage a valve seat of the valve body. A module flow path can include an inlet flow path from the module inlet to the module orifice and an outlet flow path from the module orifice to the module outlet. A sensor can include a first sensor disposed in sensing communication with the inlet flow path and a second sensor disposed in sensing communication with the outlet flow path. A sensor can be in fluid communication with one or more flow paths, such as a module flow path.

A module can include a bowl, one or more interior chambers or reservoirs and one or more walls therebetween. One or more sensors can be disposed at least partially within one or more interior chambers. At least a portion of an interior chamber can be fluidically separate from the bowl. One or more auxiliary flow paths can be fluidically coupled to a module flow path and at least a portion of one or more interior chambers.

A valve can include a body, one or more inlets for allowing fluid flow into the body, one or more outlets for allowing fluid flow out of the body, one or more flow passages or other fluid paths between the inlet and the outlet and one or more smart modules or adapters for routing and sensing fluid disposed within a flow passage or other fluid path. A valve can include a valve orifice and a module orifice or other opening fluidically between an inlet and an outlet. A flow path can include a plurality of flow paths, which can include an inlet flow path and an outlet flow path. A valve can include one or more modules in an inlet flow path, an outlet flow path, another flow path, or a combination thereof.

A transmitting coil can be coupled to a solenoid assembly and a receiving coil can be coupled to a module. A transmitting coil can be adapted to wirelessly transmit power to a receiving coil. A valve can include one or more controllers coupled to a solenoid and adapted to communicate with and process signals from one or more sensors. A controller can be housed at least partially within a solenoid housing and can be adapted to transmit electronic data to a valve control system external of or otherwise outside of or distal from the solenoid housing. One or more modules can be threadingly coupled to at least one of a valve body, a solenoid assembly and a combination thereof. One or more modules can include a plurality of internal chambers and a plurality of sensors coupled to the one or more modules. One or more sensors can be disposed in a separate one or more of a plurality of internal chambers.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the invention(s) for which patent protection is sought. Those skilled in the art will appreciate that not all features of a commercial embodiment of the disclosure are described or shown for the sake of clarity and understanding. Persons of skill in this art will also appreciate that the development of an actual commercial embodiment incorporating aspects of the present disclosure can require numerous implementation-specific decisions to achieve the developer's ultimate goal for the commercial embodiment(s). Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in the art having the benefits of this disclosure. It must be understood that the embodiment(s) disclosed and taught herein are susceptible to numerous and various modifications and alternative forms. The use of a singular term, such as, but not limited to, "a," is not intended as limiting of the number of items. The use of relational terms, such as, but not limited to, "top," "bottom," "left," "right," "upper," "lower," "down," "up," "side," "first," "second," ("third" et seq.), "inlet," "outlet" and the like are used in the written description for clarity in specific reference to the Figures and are not intended to limit the scope of the disclosure or the appended claims unless otherwise indicated. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one member with another in a unity fashion. The coupling can occur in any direction, including rotationally. The terms "include" and "such as" are illustrative and not limitative, and the word "can" means "can, but need not" unless otherwise indicated. Notwithstanding any other language in the present disclosure, the embodiment(s) shown in the drawings are examples presented for purposes of illustration and explanation and are not the only embodiments of the subject(s) hereof.

Applicants have created systems and methods for improved solenoid valves having smart or intelligent features. Applicants have created systems and methods for adding one or more smart or intelligent features to solenoid valves, which can include doing so in a modular fashion or as another example via retrofitting (or both). Applicants have created systems and methods for adding one or more smart or intelligent features to a standard or other solenoid valve through the use of an adaptor or module. In at least one embodiment, an adapter can be interposed between a valve body and a solenoid base. In at least one embodiment, a valve can include an adapter and a unique coil assembly, which can allow for the transformation of a standard solenoid valve into a smart solenoid valve having advantageous communication, sensor and monitoring features. Applicants have created systems and methods for advantageous manufacture of smart solenoid valves, which can include converting conventional solenoid valves into smart valves according to the disclosure. In at least one embodiment, a valve can include an adapter or module coupled to a valve body and solenoid assembly and/or an enhanced solenoid coil for providing or adding additional functions or functionality to a solenoid valve. In at least one embodiment, a system for fluid flow can include a solenoid valve having a valve body, a solenoid and a smart module. One or more aspects and embodiments of the disclosure will be described in further detail below with reference to the Figures.

Figure 1:
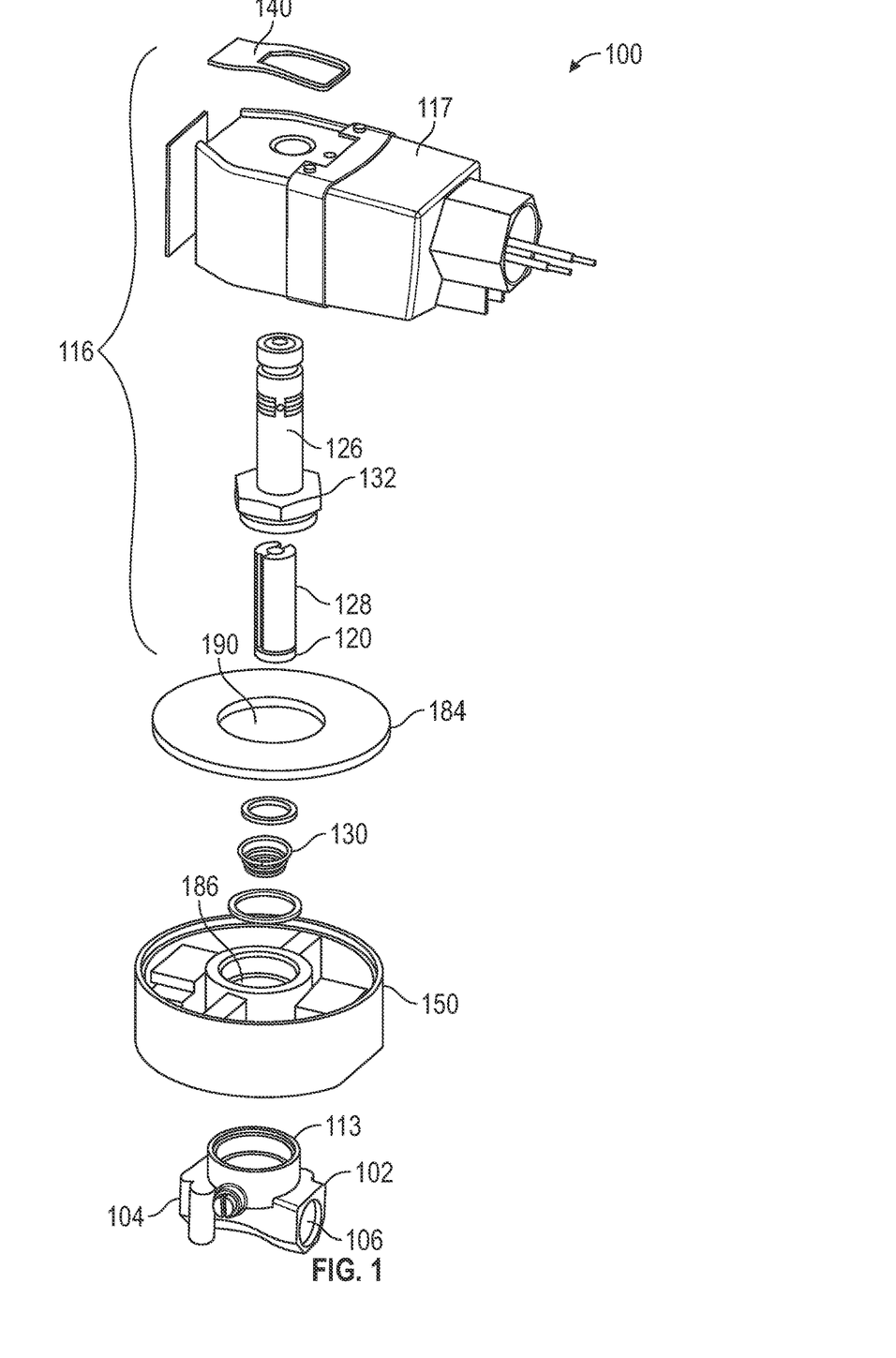
FIG. 1 is an exploded perspective view of one of many embodiments of a valve according to the disclosure.
Figure 2:
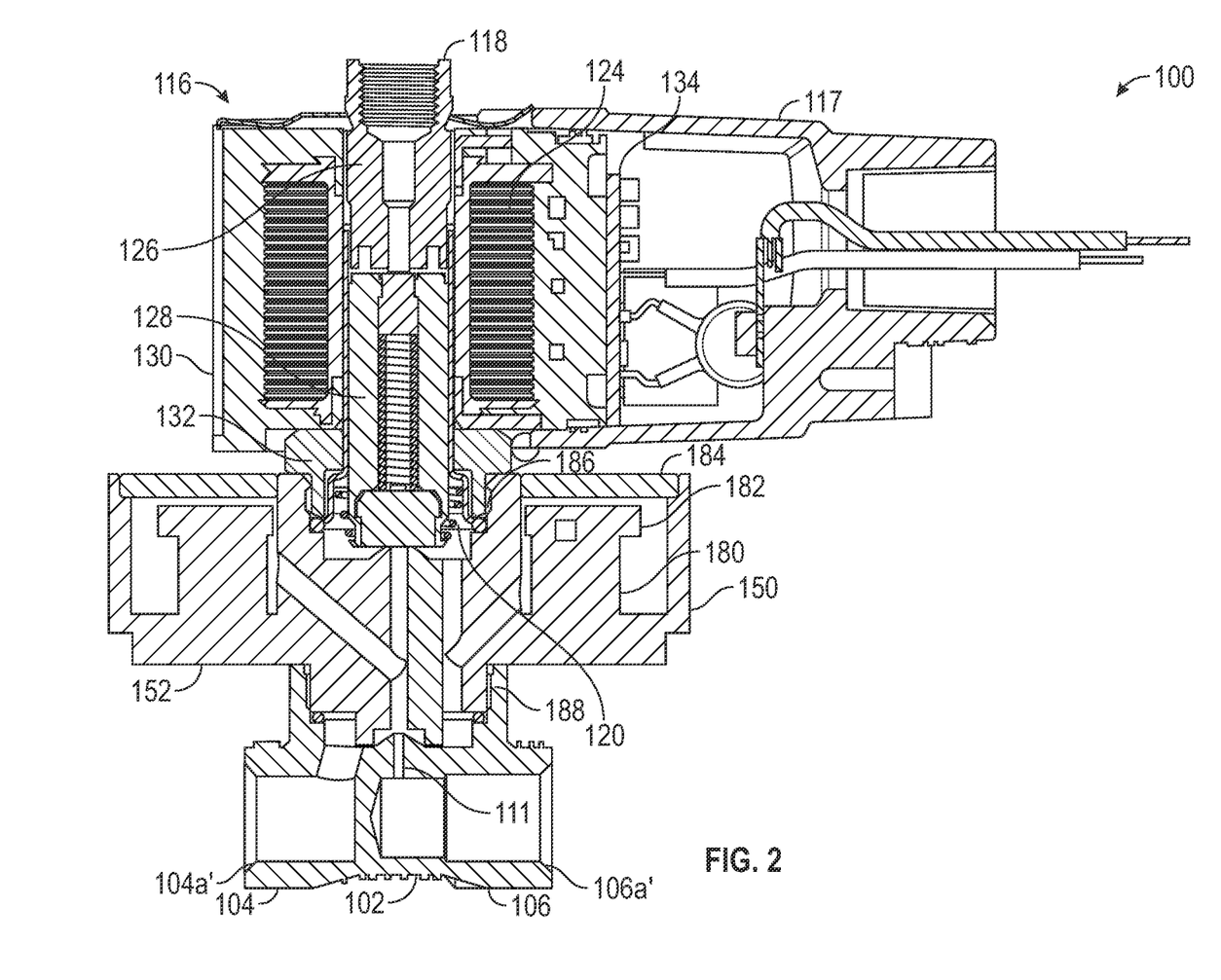
FIG. 2 is a cross-sectional side view of the valve of FIG. 1.
Figure 3:
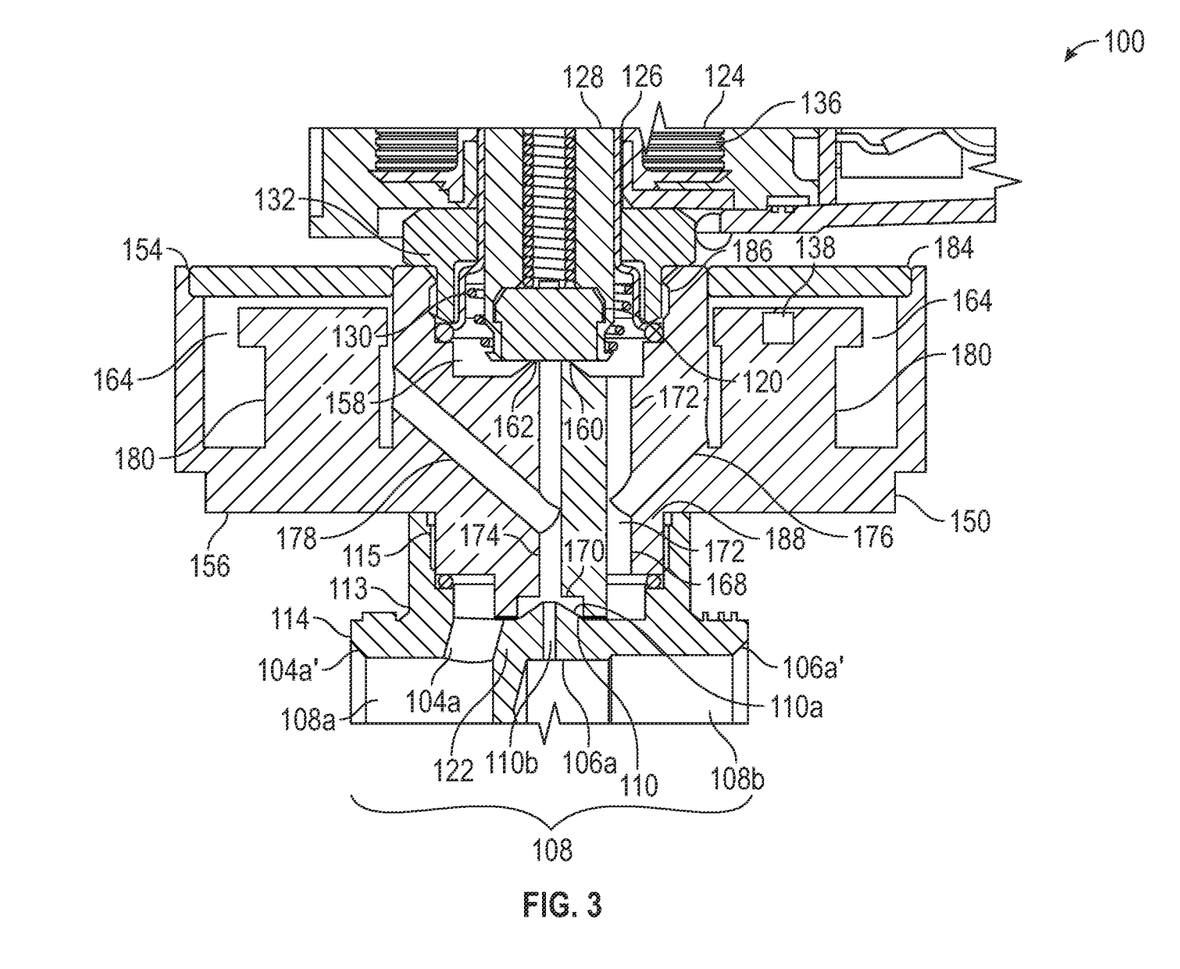
FIG. 3 is another cross-sectional side view of the valve of FIG. 1.
Figure 4:
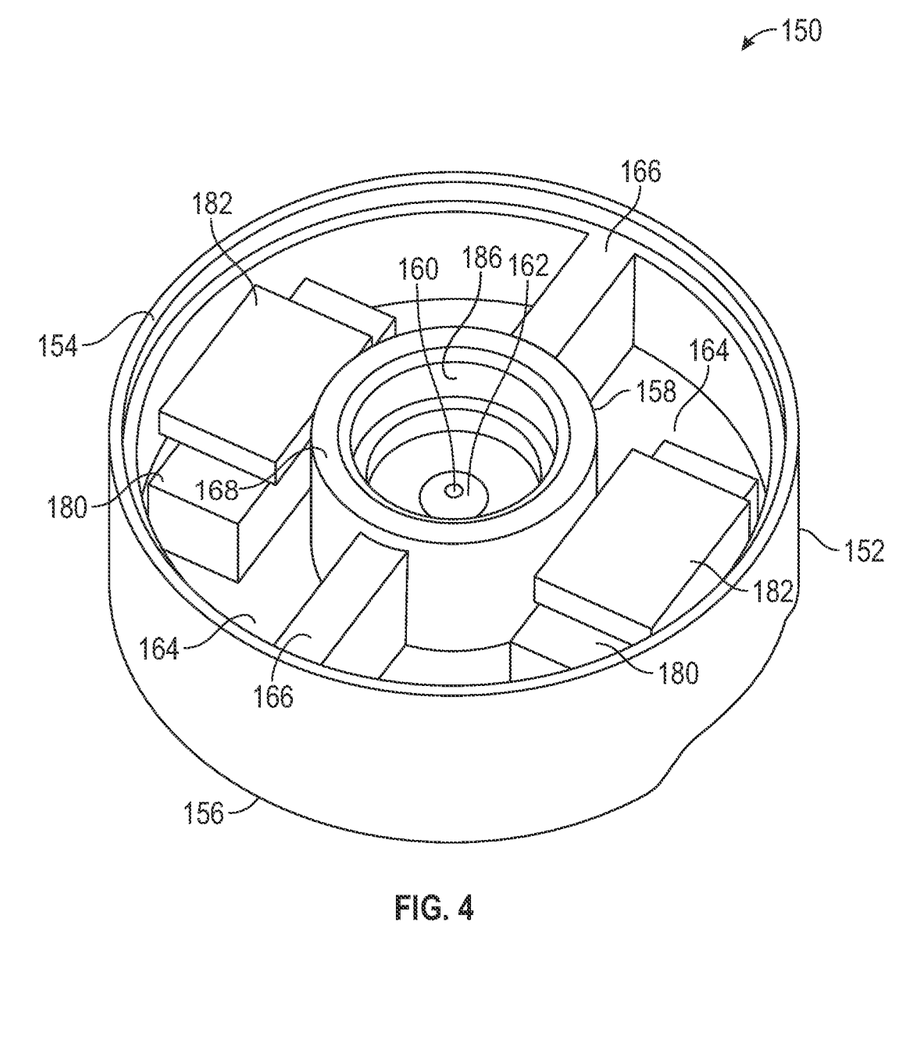
FIG. 4 is a perspective view of one of many embodiments of a valve module according to the disclosure.

FIG. 1 is an exploded perspective view of one of many embodiments of a valve according to the disclosure. FIG. 2 is a cross-sectional side view of the valve of FIG. 1. FIG. 3 is another cross-sectional side view of the valve of FIG. 1. FIG. 4 is a perspective view of one of many embodiments of a valve module according to the disclosure. FIGS. 1-4 will be described in conjunction with one another.

In at least one embodiment, a solenoid valve 100 can include a valve body 102, such as a casing, enclosure, bowl or housing, for enclosing, protecting or otherwise supporting one or more other valve components, and can include one or more inlets 104 for fluid flow into the valve and one or more outlets 106 for fluid flow out of the valve. Valve body 102 can be or include a single, unitary body or can include a plurality of valve body portions coupled together. Valve body 102 can be formed in any shape or manner according to an implementation of the disclosure and valve 100 can include any number of bodies 102 or body portions according to a particular implementation, any of which can be coupled with one another in any applicable fashion, which can, but need not, include the use of one or more couplers for coupling two or more valve components together, such as male couplers, female couplers, fasteners, receivers, adhesives or other coupling structure(s), separately or in combination. Inlet 104 can include a plurality of inlet components or other inlet portions coupled or otherwise disposed in fluid communication. For example, inlet 104 can include one or more inlet openings, such as an opening 104a in an inside surface 112 and an opening 104a' in an outside surface 114 of body 102, for allowing fluid flow in one or more directions between the inside and outside of body 102. Openings 104a, 104a' can have the same or different cross-sectional shapes and/or dimensions, which can be any shape(s) and dimension(s) according to a particular application. Inlet 104 can include or be configured to couple with an inlet conduit (not shown) for routing fluid or otherwise allowing fluid to move there through, such as from a location outside of valve 100 to or through inlet opening(s) 104a. Inlet 104 can be configured to couple with other structure in a valve or fluid system, such as pipes, tubing, hoses, fluid sources, fluid receivers, fluid destinations or other conduits or components, which can be or include a separate coupler or an integral coupler portion, in whole or in part. For example, valve 100 can be configured to couple with one or more other components of a fluid system threadedly, by sweating or brazing, by compression fitting, or otherwise, and include any type of fastener, fitting or other coupler now known or future developed, separately or in combination with one another. As will be understood by a person of ordinary skill in the art having the benefits of the present disclosure, the foregoing description regarding inlet 104 can apply similarly to one or more other inlets, outlets or other fluid ways of valve 100. For example, outlet 106 can include one or more outlet openings 106a, 106a' and/or one or more outlet conduits or outlet couplers. Alternatively, one or more of these components can be absent, as appropriate in accordance with a particular application. In the relevant field, some may refer to a valve as a "valve fitting," for example, when structure(s) such as conduits, connections, or couplers are present. As used in the present disclosure, the term "valve" includes "valve fittings" when referring to the device as a whole (e.g., valve 100), unless otherwise indicated.

Valve 100 can include one or more flow passages 108, such as a valve flow passage, fluid route or other flow path, for routing or otherwise directing fluid through the valve from inlet 104 to outlet 106 (or vice versa). Each flow passage 108 can include, or at least can be described to include for ease of illustration and explanation, two or more sub-flow passages (or component flow passages) that collectively make up the corresponding flow passage 108 through the valve. For example, in at least one embodiment, flow passage 108 can include one or more first passages 108a, such as an inlet or other flow passage, from inlet 104 to a location along passage 108 and one or more second flow passages 108b, such as an outlet or other flow passage, from such location to outlet 106. Valve 100 can include one or more other component flow passages as described in further detail elsewhere herein, separately or in combination with one another and/or any of first and second flow passages 108a, 108b. Further, each component flow passage can, but need not, comprise a plurality of passages or other paths between two or more points along flow passage 108.

Valve 100 can include one or more orifices 110, such as an opening, conduit or other passageway, for at least partially restricting or otherwise affecting flow through the valve. Orifice 110 can be disposed at least partially within flow passage 108, such as fluidicly between inlet 104 and outlet 106. Orifice 110 can be disposed at least partially within body 102, but need not be, and can alternatively be disposed outside of body 102 (wholly or partially) while nonetheless being configured for routing or otherwise allowing fluid to flow between inlet 104 and outlet 106 along flow passage 108. For example, orifice 110 can be disposed within a bypass or other conduit in fluid communication with another portion of flow passage 108 through or within body 102. Orifice 110 can, but need not, include a plurality of openings or other flow paths for defining a portion of one or more flow passages of valve 100, such as, for example, an orifice flow passage 111 forming a part of flow passage 108. Orifice 110 can include one or more orifice inlets 110a for allowing fluid to enter the orifice and one or more orifice outlets 110b for allowing fluid to exit the orifice. Orifice 110 can include one or more seats 122 for cooperating with a valve member 120 as further described below. In at least one embodiment, valve 100 or a portion thereof, such as valve body 102, can include a bowl 113, such as a reservoir or other space, for routing fluid through at least a portion of valve 100 and cooperating with one or more other valve components, such as an actuator 118 or actuator assembly 116 further described below. Orifice 110 can be disposed in fluid communication with bowl 113. Bowl 113 can be configured to couple with one or more other valve components in any manner according to an implementation of the disclosure, such as sealingly, threadedly, removably, permanently, or otherwise, in whole or in part. For example, at least a portion of body 102 or bowl 113 can include one or more couplers 115, such as threads or other structure for coupling with, e.g., an actuator assembly or other valve component.

Valve 100 can include an actuator assembly 116, such as a solenoid actuator assembly, for controlling fluid flow through at least a portion of valve 100, separately or in cooperation with one or more other valve components. Actuator assembly 116 can be adapted to couple to one or more other valve components, such as valve body 102 or a component coupled to valve body 102, directly or indirectly, in whole or in part. In at least one embodiment, actuator assembly 116 can include an actuator 118, such as a solenoid actuator, and a housing 117, such as an at least partial enclosure, for holding or otherwise supporting one or more components of actuator assembly 116 and/or other valve components. Actuator 118 can be adapted for moving and/or retaining or otherwise holding one or more valve members 120 to, from or in one or more positions. Valve member 120 can have any number of positions according to a particular application. For example, valve member 120 can have a fully closed position for maximizing resistance to flow through at least a portion of valve 100, which can include preventing flow there through. As another example, valve member 120 can have a fully open position for minimizing resistance to flow through at least a portion of valve 100, such as by minimizing flow resistance caused by valve member 120 or a portion thereof. Valve member 120 can have one or more partially open (or partially closed) positions between the fully open and fully closed positions for allowing fluid flow at one or more rates between a maximum and a minimum flow rate, which can be any flow rate(s) according to an embodiment or implementation at hand.

Actuator 118 can be or include structure for holding one or more valve members 120 in one or more positions and for moving such valve member(s) among positions, such as between two or more of the positions described above. For example, actuator 118 can move valve member 120 between opened and closed positions with respect to orifice 110 or an orifice in fluid communication with orifice 110. Valve 100 can include one or more valve seats 122 for optionally coupling with a corresponding valve member 120. Valve seat 122 can, but need not, be a portion of orifice 110 (e.g., of orifice inlet 110a) and/or valve body 102, in whole or in part. Valve member 120 and one or more seats 122 can be configured to sealingly couple with one another for preventing or otherwise limiting fluid flow through one or more portions of flow passage 108, such as through orifice flow passage 111, in whole or in part. For instance, in at least one embodiment, valve 100 can have a fully closed position wherein valve member 120 and seat 122 are sealingly engaged for preventing flow into and/or through orifice 110 and one or more open positions wherein valve member 120 and seat 122 are not sealingly engaged and, rather, are disposed relative to one another for allowing fluid flow.

Actuator assembly 116 can be or include any type of solenoid actuator(s) and valve member(s) according to an implementation of the disclosure, whether now known or later developed. For example, in at least one embodiment, actuator 118 can include a solenoid coil 124 for generating a magnetic field and interacting with one or more other actuator components, which can include one or more at least partially fixed components, such as plunger housing 126, and one or more at least partially movable components, such as plunger 128. Valve member 120 can be coupled to plunger 128, which can be at least partially magnetic, and actuator 118 or a portion thereof, such as coil 124, can move plunger 128 and valve member 120 up and/or down or otherwise relative to one or more seats 122. Actuator assembly 116 can include one or more springs 130 for biasing plunger 128 in one or more directions or toward one or more positions, such as a default open or closed position in the absence of actuation force from coil 124 sufficient to overcome a biasing force of spring(s) 130. Actuator assembly 116 can include a base 132 for coupling actuator assembly 116 to one or more other valve components (e.g., valve body 102), threadingly, sealingly, or otherwise, whether separately or in combination with one or more other couplers, such as retainer 140 (e.g., a spring clip or other fastener) for coupling housing 117 with plunger housing 126. For example, base 132 can be adapted to couple with bowl 113 of valve body 102, such as by way of threaded engagement or via utilization of one or more other fasteners. As another example, base 132 can be adapted to couple with one or more modules 150 as further described below.

In at least one embodiment, valve 100 can include one or more modules 150, such as an adapter, connector or converter, for coupling with at least one of valve body 102 and actuator assembly 116. Module 150 can include a module body 152 for at least partially housing, enclosing or otherwise supporting one or more components and, in at least one embodiment, can be adapted for containing or otherwise resisting pressure, such as fluid pressure from fluid in or flowing through valve body 102. Module 150 can have a top 154 or other portion for coupling with actuator assembly 116 or a portion thereof and a bottom 156 or other portion for coupling with valve body 102 or a portion thereof. Module 150 can have one or more bowls 158 for receiving and/or routing fluid and cooperating with one or more components of actuator assembly 116. For example, at least a portion of bowl 158 can be adapted for coupling with base 132 and module 150 can include one or more orifices 160 having a seat(s) 162 for optional sealing engagement with valve member 120 or plunger 128. Module 150 can include one or more reservoirs 164, such as spaces or compartments, for holding or otherwise supporting one or more other valve components. In at least one embodiment, one or more reservoirs 164 can be at least partially fluidically separate or separable from bowl 158 and/or one another (i.e., in an embodiment having a plurality of reservoirs, which is but one embodiment of many). For example, in at least one embodiment, module 150 can include one or more reservoirs 164 fluidically upstream of bowl 158 and one or more reservoirs 164 fluidically downstream from bowl 158. Module 150 can include one or more walls 166 for at least partially fluidically separating one or more reservoirs 164 and/or bowl 158, which, in at least one embodiment, can include one or more walls of bowl 158.

Module 150 can be adapted for fluid communication with at least a portion of valve body 102 and/or actuator assembly 116, which can include having one or more fluid conduits or other flow paths therein or therethrough. In at least one embodiment, such flow paths can be formed or disposed at least partially in or through module body 102, integrally or otherwise, and can be configured for cooperating with at least a portion of valve body 102 and/or actuator assembly 116 to form a fluid tight enclosure, separately or in combination with one or more other valve components. For example, module 150 can include one or more inlets 168 for receiving fluid from an inlet 104 or upstream side of valve body 102 and one or more outlets 170 for routing fluid to an outlet 106 or downstream side of valve body 102. Module 150 can have one or more flow paths 172 from inlet 168 to bowl 158 and one or more flow paths 174 from bowl 158 to outlet 170, such as a flow path for fluid communication among or between orifice 110 and orifice 160. In at least one embodiment, module 150 can have one or more additional or auxiliary flow paths, such as flow path 176 in fluid communication with flow path 172 and one or more reservoirs 164 (e.g., an inlet side reservoir) and flow path 178 in fluid communication with flow path 174 and one or more reservoirs 164 (e.g., an outlet side reservoir). In this manner, one or more valve components in fluid communication with one or more of reservoirs 164 can be exposed to one or more inlet or outlet side conditions of fluid flowing in or through module 150 and/or other portions of valve 100.

In at least one embodiment, module 150 can include one or more sensors 180 disposed at least partially therein, such as in or on module body 152 or in one or more reservoirs 164, for sensing one or more conditions or other parameters of fluid flow or valve operations. Sensors 180 can be or include any type of sensor(s) according to an implementation of the disclosure, including, but not limited to, sensors for temperature, pressure, flow, flow rate, viscosity, or other fluid flow variables, separately or in combination, in whole or in part. In at least one embodiment, module 150 can include sensor electronics 182 for controlling, powering, and/or processing or communication one or more signals to or from one or more sensors 180. In at least one embodiment, sensor electronics 182 can be disposed at least partially in or on module body 152 or in one or more reservoirs 164 and arranged for cooperating or communicating with one or more sensors 180. Sensor electronics 182 can be or include any type of electronics for supporting one or more sensors 180, including, but not limited to, power equipment, controllers, batteries, transmitters, receivers, processors and the like, separately or in combination, in whole or in part. In at least one embodiment, sensor electronics 182 can be or include wireless communication or coupling equipment for wirelessly cooperating with one or more other components of valve 100, such as actuator assembly 116 or a portion thereof. For example, actuator assembly 116 can include one or more controllers 134 for controlling one or more aspects of actuator 118 or other valve operations, which can include communicating with and/or processing signals or information from one or more sensors 180 or sensor electronics 182. As another example, valve 100 can include one or more wireless power transmitters, which, in at least one embodiment, can include a transmission coil 136 disposed in or coupled to housing 117 and a receiving coil 138 disposed in reservoir 164 or another portion of module 150. Transmission coil 136 can, but need not, be part of coupled to coil 124 and can wirelessly transmit power to receiving coil 138 for powering or charging one or more components of sensor electronics 182 or sensor 180.

In at least one embodiment, module 150 can include one or more covers 184 for at least partially enclosing or sealing one or more portions of module 150, such as one or more reservoirs 164, whether separately or in combination with one or more other valve components. For example, one or more covers 184 can sealingly couple with the top 154, bowl 156 and/or another portion(s) of module 150 or body 152, whether separately or in combination with one or more components of actuator assembly 116 (e.g., base 132 or one or more couplers). In at least one embodiment, module 150 can include one or more couplers 186 for coupling with an actuator and one or more couplers 188 for coupling with a valve body. Such couplers can be or include, for example, male or female couplers having threads, quarter turn components, and/or other structure for coupling with one or more other valve components. In at least one embodiment, cover 184 can be configured for cooperating with one or more couplers 186, 188, which can include having one or more openings 190 for receiving and/or sealingly coupling with at least a portion of one or more couplers 186, 188, whether separately or in combination with one or more other portions of module 150. In this manner, and those described above, module 150 can be adapted for supporting one or more smart features of valve 100, modularly or otherwise, and, in at least one embodiment, can allow for the provision of smart features in a relatively compact configuration and/or without the need for wired connections and other junctions that in at least some cases can tend to be prone to leakage or premature valve malfunction or failure. In at least one embodiment, module 150 can be or include a body 152 adapted for modular or other conversion of an existing conventional or other valve or lines of valves into a valve having one or more aspects of the present disclosure. In at least one embodiment, module 150 can be or include a body 152 adapted for inclusion in a newly manufactured valve or line of valves.

In at least one embodiment, a module for a solenoid valve can include a body having a module inlet for allowing fluid flow into the body, a module outlet for allowing fluid flow out of the body and a module flow path fluidically between the module inlet and the module outlet, a module orifice and a module valve seat fluidically disposed in the module flow path, a first reservoir disposed within the body, a first sensor disposed in sensing communication with the first reservoir, a first coupler configured to couple with a solenoid actuator, and a second coupler configured to couple with a valve body. A module flow path can include an inlet flow path from the module inlet to the module orifice and an outlet flow path from the module orifice to the module outlet. A first reservoir can be in fluid communication with at least one of the inlet flow path and the outlet flow path.

An auxiliary flow path can have a first end in fluid communication with the first reservoir and a second end in fluid communication with at least one of the inlet flow path and the outlet flow path. A module orifice and a module valve seat can be disposed in fluid communication with the first coupler and the module valve seat can be configured to sealingly couple with a valve member of a solenoid actuator. A module outlet can be disposed in fluid communication with a second coupler and can be configured to sealingly engage a valve seat of a valve body. One or more modules can be configured to be coupled to, which can include being disposed at least partially fluidically between, a valve actuator and a valve body configured to couple with one another. One or more sensors can be disposed at least partially (or fully) within one or more reservoir or other portions of a module.

In at least one embodiment, a module can include a second reservoir disposed within the body and a second sensor disposed in sensing communication with the second reservoir. A first reservoir can be in fluid communication with one of the inlet flow path and the outlet flow path and a second reservoir can be in fluid communication with the other of the inlet flow path and the outlet flow path. A first sensor can be disposed at least partially within a first reservoir and a second sensor can be disposed at least partially within a second reservoir. A module can include a cover removably coupled to the module body. A cover can be configured to enclose at least a portion of one or more reservoirs. A cover can include one or more openings configured to couple with at least a portion of one or more couplers or other valve or module components.

In at least one embodiment, a module can include a plurality of reservoirs, such as first, second, third and/or other reservoirs, and can include one or more walls or other borders or structures disposed at least partially between one or more reservoirs, which can include forming at least a portion of a reservoir wall or other boundary. In at least one embodiment, a module can include one or more receiving coils configured to wirelessly or otherwise receive power from one or more transmitting coil. One or more sensors and one or more receiving coils can be disposed at least partially within a module body. In at least one embodiment, a solenoid valve can include a body, an actuator and a module according to the disclosure.

In at least one embodiment, a solenoid valve can include a valve body having a valve inlet and a valve outlet, a solenoid actuator having a solenoid coil, a movable plunger in magnetic communication with the coil and a valve member coupled to the plunger, and one or more modules. One or more modules can include a body having a module inlet for allowing fluid flow into the body, a module outlet for allowing fluid flow out of the body and a module flow path fluidically between the module inlet and the module outlet, a module orifice and a module valve seat fluidically disposed in the module flow path, a first reservoir disposed within the body, a first sensor disposed in sensing communication with the first reservoir, a first coupler configured to couple with a solenoid actuator and a second coupler configured to couple with a valve body. A module flow path can include an inlet flow path from the module inlet to the module orifice and an outlet flow path from the module orifice to the module outlet. A first reservoir can be in fluid communication with at least one of the inlet flow path and the outlet flow path. A first coupler can be coupled to the solenoid actuator and a second coupler can be coupled to the valve body.

In at least one embodiment, a valve member of a solenoid actuator can be configured to sealingly engage a module valve seat. A module outlet can be sealingly coupled to a valve seat of a valve body. A solenoid actuator and a valve body can be configured to operably couple with one another in the absence of a module. A first sensor can be disposed in sensing communication with an inlet flow path and a second sensor can be coupled to a module body and disposed in sensing communication with an outlet flow path. A transmitting coil can be coupled to a solenoid actuator and a receiving coil can be coupled to a module. A transmitting coil can be adapted to wirelessly transmit power to a receiving coil. One or more controllers can be coupled to a solenoid actuator and configured to process signals from one or more sensors. One or more controllers can be housed at least partially within a solenoid housing and/or can be adapted to transmit electronic data to a valve control system.

A solenoid valve can include a valve body having a valve inlet and a valve outlet, a solenoid having a solenoid coil, a movable plunger in magnetic communication with the coil and a valve member coupled to the plunger, a module coupled to the valve body and the solenoid, the module comprising a module inlet disposed in fluid communication with the valve inlet, a module outlet disposed in fluid communication with the valve outlet, a module orifice and a module valve seat disposed along a module flow path fluidically between the module inlet and the module outlet, and one or more sensors coupled to the module and disposed in sensing communication with the module flow path.

A valve member of the solenoid can be adapted to sealingly engage the module valve seat. A module inlet can be adapted to sealingly engage a valve seat of the valve body. A module flow path can include an inlet flow path from the module inlet to the module orifice and an outlet flow path from the module orifice to the module outlet. A sensor can include a first sensor disposed in sensing communication with the inlet flow path and a second sensor disposed in sensing communication with the outlet flow path. A sensor can be in fluid communication with one or more flow paths, such as a module flow path.

A module can include a bowl, one or more interior chambers or reservoirs and one or more walls therebetween. One or more sensors can be disposed at least partially within one or more interior chambers. At least a portion of an interior chamber can be fluidically separate from the bowl. One or more auxiliary flow paths can be fluidically coupled to a module flow path and at least a portion of one or more interior chambers.

A transmitting coil can be coupled to a solenoid assembly and a receiving coil can be coupled to a module. A transmitting coil can be adapted to wirelessly transmit power to a receiving coil. A valve can include one or more controllers coupled to a solenoid and adapted to communicate with and process signals from one or more sensors. A controller can be housed at least partially within a solenoid housing and can be adapted to transmit electronic data to a valve control system external of or otherwise outside of or distal from the solenoid housing. One or more modules can be threadingly coupled to at least one of a valve body, a solenoid assembly and a combination thereof. One or more modules can include a plurality of internal chambers and a plurality of sensors coupled to the one or more modules. One or more sensors can be disposed in a separate one or more of a plurality of internal chambers.

The systems and methods disclosed herein are not limited to the exemplary valve types shown in the Figures for illustrative purposes and can be applicable or applied to many different types and styles of solenoid valves, solenoid valve components and solenoid valve systems. Further, while the teachings of the disclosure can be particularly advantageous for solenoid valves, they are not necessarily limited thereto and valve 100 can be or include any type of valve, whether now known or later developed, such as, for example, linear, rotary, solenoid, pilot, diaphragm, mechanical, electromechanical, hydraulic, pneumatic and other types of valves for manipulating the passage of one or more fluids across a distance or point, separately or in combination, in whole or in part. The term "fluid(s)" as used herein includes any substance or material capable of flowing, such as, for example, liquid(s), gas(es) and combinations thereof (regardless of whether one or more solids or other non-fluids may be present therein).

Other and further embodiments utilizing one or more aspects of the systems and methods described above can be devised without departing from the spirit of Applicants' disclosures. For example, the systems and methods disclosed herein can be used alone or to form one or more parts of other valves, valve components and/or fluid control systems. Further, the various methods and embodiments of the valves and modules can be included in combination with each other to produce variations of the disclosed methods and embodiments. Discussion of singular elements can include plural elements and vice-versa. References to at least one item followed by a reference to the item can include one or more items. Also, various aspects of the embodiments can be used in conjunction with each other to accomplish the understood goals of the disclosure.

Unless the context requires otherwise, the words "comprise," "include," and "has" (including variations and conjugations thereof, such as "comprises," "including," "have" and so forth) should be understood to imply the inclusion of at least the stated element or step or group of elements or steps or equivalents thereof, and not the exclusion of a greater numerical quantity or any other element or step or group of elements or steps or equivalents thereof. The devices, apparatuses and systems can be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components and/or can be combined into components having multiple functions.

The embodiments have been described in the context of preferred and other embodiments and not every embodiment of Applicants' disclosure has been described. Obvious modifications and alterations to the described embodiments are available to those of ordinary skill in the art having the benefits of the present disclosure. The disclosed and undisclosed embodiments are not intended to limit or restrict the scope or applicability of Applicants' disclosures, but rather, in conformity with the patent laws, Applicants intend to fully protect all such modifications and improvements that come within the scope or range of equivalents of the claims.

What is claimed is:

1. A module for a solenoid valve, comprising:
   a body having a module inlet for allowing fluid flow into the body, a module outlet for allowing fluid flow out of the body and a module flow path fluidically between the module inlet and the module outlet;
   a module orifice and a module valve seat fluidically disposed in the module flow path;
   a first reservoir disposed within the body;
   a first sensor disposed in sensing communication with the first reservoir, wherein the first sensor is disposed at least partially within the first reservoir;
   a first coupler configured to couple with a solenoid actuator; and
   a second coupler configured to couple with a valve body;
   wherein the module flow path comprises an inlet flow path from the module inlet to the module orifice and an outlet flow path from the module orifice to the module outlet;
   wherein the first reservoir is in fluid communication with at least one of the inlet flow path and the outlet flow path; and
   wherein the module outlet is disposed in fluid communication with the second coupler and is configured to sealingly engage a valve seat of the valve body.

2. The module of claim 1, further comprising an auxiliary flow path having a first end in fluid communication with the first reservoir and a second end in fluid communication with at least one of the inlet flow path and the outlet flow path.

3. The module of claim 1, wherein the module orifice and the module valve seat are disposed in fluid communication with the first coupler and wherein the module valve seat is configured to sealingly couple with a valve member of the solenoid actuator.

4. The module of claim 1, wherein the module is configured to be coupled to and disposed fluidically between the solenoid actuator and the valve body.

5. The module of claim 1, further comprising:
   a second reservoir disposed within the body; and
   a second sensor disposed in sensing communication with the second reservoir;
   wherein the first reservoir is in fluid communication with one of the inlet flow path and the outlet flow path and the second reservoir is in fluid communication with the other of the inlet flow path and the outlet flow path.

6. The module of claim 5, wherein the first sensor is disposed at least partially within the first reservoir and the second sensor is disposed at least partially within the second reservoir.

7. The module of claim 1, further comprising a cover removably coupled to the body, wherein the cover is configured to enclose at least a portion of the first reservoir and wherein the cover comprises an opening configured to couple with at least a portion of the first coupler.

8. The module of claim 1, further comprising a second reservoir disposed within the body and one or more walls disposed at least partially between the first reservoir and the second reservoir.

9. The module of claim 1, further comprising a receiving coil coupled to the module, wherein the receiving coil is configured to wirelessly receive power from a transmitting coil.

10. The module of claim 9, wherein the first sensor and the receiving coil are disposed within the body.

11. A solenoid valve, comprising:
    a valve body having a valve inlet and a valve outlet;
    a solenoid actuator having a solenoid coil, a movable plunger in magnetic communication with the coil and a valve member coupled to the plunger; and
    a module comprising
    a module body having a module inlet for allowing fluid flow into the module body, a module outlet for allowing fluid flow out of the module body and a module flow path fluidically between the module inlet and the module outlet;
    a module orifice and a module valve seat fluidically disposed in the module flow path;
    a first reservoir disposed within the module body;
    a first sensor disposed in sensing communication with the first reservoir;
    a first coupler configured to couple with the solenoid actuator; and
    a second coupler configured to couple with the valve body;
    wherein the module flow path comprises an inlet flow path from the module inlet to the module orifice and an outlet flow path from the module orifice to the module outlet; and
    wherein the first reservoir is in fluid communication with at least one of the inlet flow path and the outlet flow path;
    wherein the first coupler is coupled to the solenoid actuator and the second coupler is coupled to the valve body;
    wherein the module outlet is sealingly coupled to a valve seat of the valve body; and wherein the first sensor is disposed in sensing communication with the inlet flow path and further comprising a second sensor coupled to the module body and disposed in sensing communication with the outlet flow path.

12. The solenoid valve of claim 11, wherein the valve member of the solenoid actuator is configured to sealingly engage the module valve seat.

13. The solenoid valve of claim 11, wherein the solenoid actuator and the valve body are configured to operably couple with one another in the absence of the module.

14. The solenoid valve of claim 11, further comprising a transmitting coil coupled to the solenoid actuator and a receiving coil coupled to the module, wherein the transmitting coil is adapted to wirelessly transmit power to the receiving coil.

15. The solenoid valve of claim 11, further comprising a controller coupled to the solenoid actuator and configured to process signals from the first sensor.

16. The solenoid valve of claim 15, wherein the controller is housed at least partially within a solenoid housing, and wherein the controller is adapted to transmit electronic data to a valve control system.

17. A module for a solenoid valve, comprising:
a body having a module inlet for allowing fluid flow into the body, a module outlet for allowing fluid flow out of the body and a module flow path fluidically between the module inlet and the module outlet;
a module orifice and a module valve seat fluidically disposed in the module flow path;
a first reservoir disposed within the body;
a first sensor disposed in sensing communication with the first reservoir;
a first coupler configured to couple with a solenoid actuator;
a second coupler configured to couple with a valve body; and
a cover removably coupled to the body, wherein the cover is configured to enclose at least a portion of the first reservoir and wherein the cover comprises an opening configured to couple with at least a portion of the first coupler;
wherein the module flow path comprises an inlet flow path from the module inlet to the module orifice and an outlet flow path from the module orifice to the module outlet; and
wherein the first reservoir is in fluid communication with at least one of the inlet flow path and the outlet flow path.

18. The module of claim 17, wherein the module outlet is disposed in fluid communication with the second coupler and is configured to sealingly engage a valve seat of the valve body.

19. The module of claim 18, further comprising:
a second reservoir disposed within the body; and
a second sensor disposed in sensing communication with the second reservoir;
wherein the first reservoir is in fluid communication with one of the inlet flow path and the outlet flow path and the second reservoir is in fluid communication with the other of the inlet flow path and the outlet flow path.

20. The module of claim 19, wherein the first sensor is disposed at least partially within the first reservoir and the second sensor is disposed at least partially within the second reservoir.

* * * * *